Figure 2:
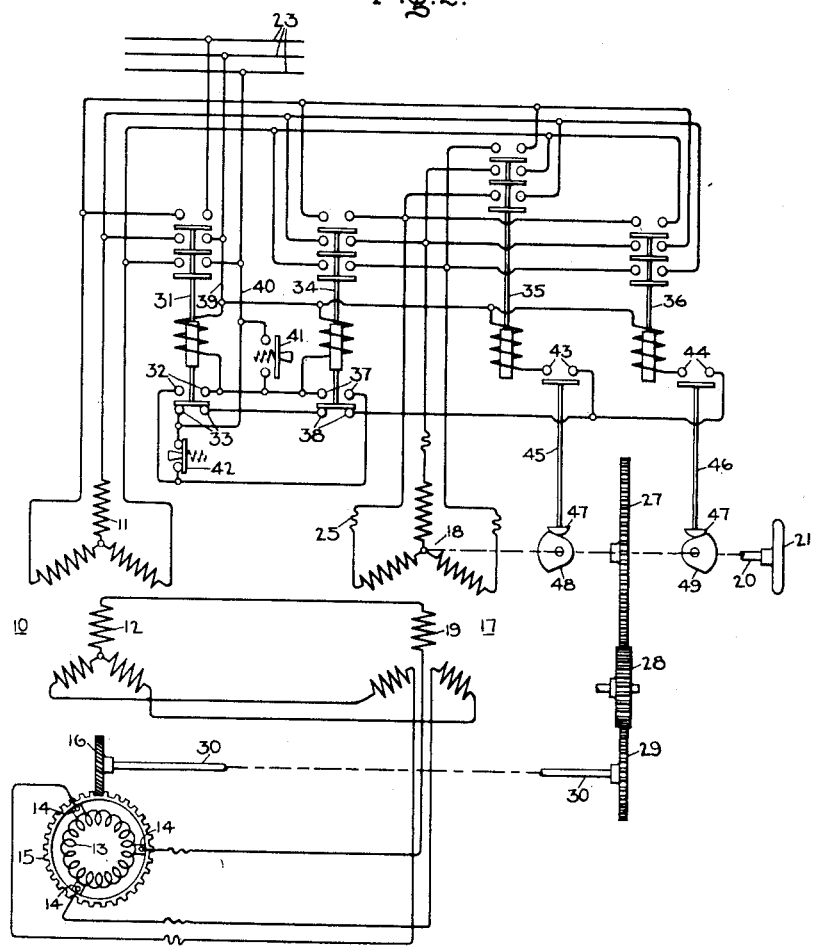

April 3, 1934. G. GUNNER 1,953,802
ALTERNATING CURRENT COMMUTATOR MACHINE
Filed May 1, 1933 2 Sheets-Sheet 1
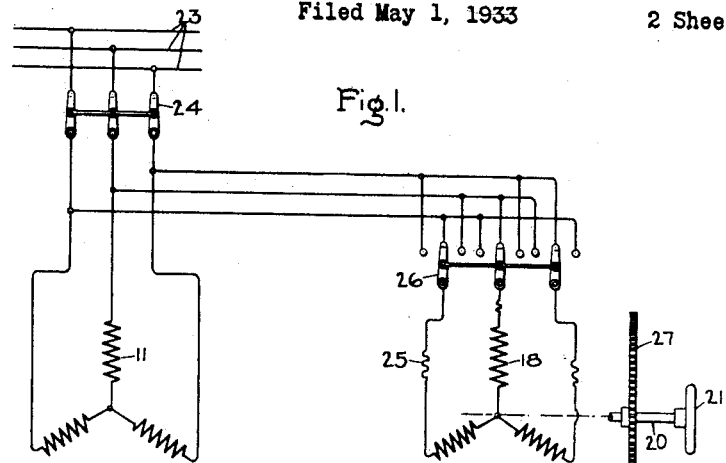
Fig. 1.
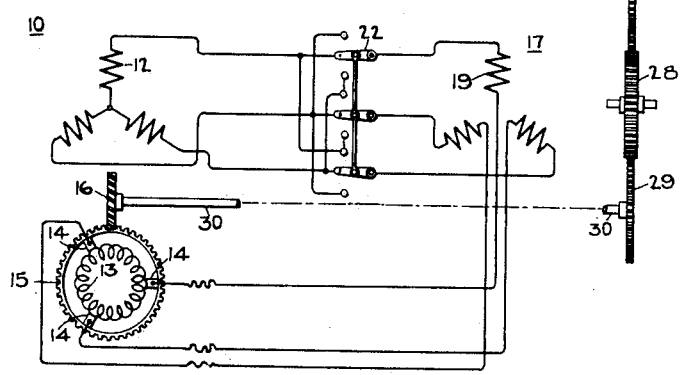
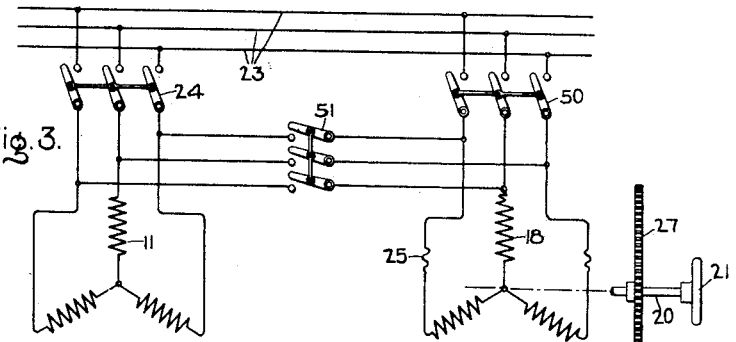
Fig. 3.
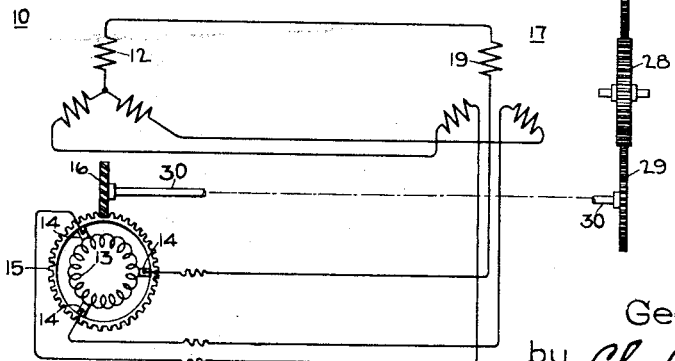
Inventor:
Georg Gunner,
by Charles E. Tullar
His Attorney.

Patented Apr. 3, 1934

1,953,802

UNITED STATES PATENT OFFICE 1,953,802

ALTERNATING CURRENT COMMUTATOR MACHINE

Georg Günner, Berlin-Siemensstadt, Germany, assignor to General Electric Company, a corporation of New York Application May 1, 1933, Serial No. 668,833
In Germany May 10, 1932

13 Claims. (Cl. 172—274)

My invention relates to alternating current commutator machines. The principal object of my invention is to provide a method of braking an alternating current commutator motor after it is disconnected from its energizing source, the braking effect being produced by the motor acting as a self-excited generator. Another important object of my invention is to provide an arrangement for carrying out my method irrespective of the position of the commutator brushes when the motor is disconnected from its energizing source.

Mechanical brakes are generally used, often in combination with magnetic brake lifters, for quickly stopping a machine driven by an alternating current commutator motor. Means of this kind are not only complicated and costly, but are also subjected to considerable wear. My invention largely overcomes these disadvantages by providing a method of operation which produces a braking action by causing the motor to act as a self-excited generator after it is disconnected from its energizing source. My invention also provides a simple and inexpensive arrangement which is operated after the motor has been disconnected from its energizing source and which establishes such connections between the rotatable commutated armature winding of the motor and a stator winding thereof that their magnetic axes are displaced and at the same time these windings are coupled in series relation. This causes the motor to operate as a self-excited generator and circulate a current through these windings until the armature winding has practically ceased rotating, thus producing an effective braking action.

My invention, however, will be best understood from the following description when considered in connection with the accompanying drawings, while those features of my invention which are believed to be novel and patentable are pointed out in the appended claims.

Fig. 1 of the drawings represents a preferred embodiment of my invention employing manually operated switching means for obtaining the braking action referred to with the commutator brushes in different positions when the motor is disconnected from its energizing source. Fig. 2 represents a modification of Fig. 1 employing switching means that are automatically operated in the proper manner in accordance with the position of the commutator brushes when the motor is disconnected from its energizing source. Fig. 3 represents a modification of Fig. 1 employing manually operated switches. Similar parts in the different figures are represented by the same reference characters.

I prefer to describe my invention in connection with a three-phase adjustable speed alternating current commutator type motor whose speed is changed by simultaneously shifting its commutator brushes and impressing thereon an alternating voltage of adjustable phase and magnitude by means of an induction voltage regulator. However, I wish it clearly understood that this is done merely for illustrative purposes and that my invention is not limited to this type of motor.

In Fig. 1, the alternating current commutator motor is diagrammatically represented generally by 10, and consists of a stationary primary winding 11, a stationary auxiliary or secondary winding 12 inductively related to the primary winding, and a rotatable commutated armature winding 13. To simplify the drawings I have not shown the commutator to which armature winding 13 is connected, and, therefore, I have shown three equally spaced apart brushes 14 resting directly on the armature winding, but it will be understood that in actual practice these brushes will rest on the commutator connected to the armature winding. Brushes 14 are carried by a rotatable brush yoke 15 having teeth cut into its outer periphery in the same way as the ordinary spiral gear so as to mesh with a rotatable spiral gear 16. The induction voltage regulator is represented generally by 17 and consists of a rotatable three-phase primary winding 18, a stationary secondary winding 19, and suitable means for rotating the primary winding, such as for example, a rotatable shaft 20 secured to the primary winding and a wheel 21 secured to the shaft. The auxiliary stator winding 12 of the motor and the secondary winding 19 of the regulator are connected in series to the commutator brushes 14 of the motor. A three-way switch 22 is interposed between these windings, each blade of this switch being adapted to make contact with any one of three stationary contacts. The object of this switch will be described later. The motor primary winding 11 may be connected to a three-phase alternating current source 23 through a switch 24. The regulator primary winding 18 is connected by flexible leads 25 to the blades of a three-way switch 26, each blade of this switch being adapted to make contact with any one of three stationary contacts which are preferably so spaced that the switch blade can be moved to a position between any two adjacent contacts without touching either of them. The object of this switch will also be described later. Switch 26, when closed, connects the regulator primary winding 18 to the terminals of the motor primary winding; hence the two primary windings are always connected to each other when this switch is closed and both windings are also connected to source 23 when switch 24 is also closed. The vector resultant of the voltages induced in the motor auxiliary winding 12 and the regulator secondary winding 19 is impressed on armature winding 13, and the speed of the motor is varied by rotating the regulator primary winding 18. This changes the time phase relationship between the voltages induced in windings 12 and 19, thus changing the magnitudes as well as the time phases of the voltages impressed on armature winding 13. In order to maintain a good power factor on this motor its commutator brushes are moved simultaneously with the rotation of the regulator primary winding 18. Any suitable means may be used for accomplishing this purpose. For the sake of illustration I have shown a simple arrangement for this purpose consisting of a gear 27 secured to shaft 20, this gear meshing with an idler gear 28 which in turn meshes with a rotatable gear 29, the latter and spiral gear 16 being both secured to a rotatable shaft 30.

A description of the operation of the above mentioned apparatus follows: During normal operation of motor 10 as a motor the regulator primary winding 18 is connected to source 23, and the motor auxiliary winding 12 and the regulator secondary winding 19 are connected in series to commutator brushes 14, hence one of the closed positions of each of switches 22 and 26 should be its motor operating position. I will assume that each of these switches is in its motor operating position when it is closed in its central position. Assume that motor 10 is to operate as a motor driving some apparatus (not shown). Switch 24 will then be closed, and each of switches 22 and 26 will be closed in its central position, as shown. With switch 26 closed in its central position there is a definite time phase relationship between the voltages impressed on motor primary winding 11 and regulator primary winding 18. Thus, the voltages impressed on their upper phase winding are in time phase because they are both connected to the same line of source 23, and for the same reason the voltages impressed on their lower right-hand phase winding are in time phase, and the voltages impressed on their lower left-hand phase winding are in time phase. With switch 22 closed in its central position there is a definite time phase relation between the voltages induced in motor auxiliary winding 12 and those impressed on its brushes 14. Thus, the voltage induced in the two phases of winding 12 between any two terminals thereof has a definite time phase relationship to the voltage between the two commutator brushes to which they are connected. The above described time phase relationships should be borne in mind as reference thereto will be made during the remainder of this specification.

Assume that motor 10 is operating as a motor with switches 22, 24, and 26 closed as shown, and that by means of wheel 21 the regulator primary winding 18 and commutator brushes 14 have been rotated to make the motor run at approximately its synchronous speed, and, therefore, the commutator brushes are at approximately their synchronous speed position. The magnetic axes of motor windings 11 and 12 are substantially coincident, and with the commutator brushes at approximately their synchronous speed position the magnetic axis of that portion of armature winding 13 between any two of its commutator brushes 14 is displaced from the magnetic axis of those two phases of winding 12 connected to these brushes and from the magnetic axis of the corresponding phases of winding 11. Now assume that with the commutator brushes in the above mentioned position, it is desired to shut down the motor and bring it quickly to rest. This may be accomplished by opening switch 24 and leaving switches 22 and 26 closed as shown. The residual magnetism in the motor and the rotation of its armature winding due to inertia cause the latter to generate an alternating voltage and, due to the above mentioned displacement between the magnetic axes of windings 11 and 13, the motor functions as a self-excited generator with winding 11 furnishing the exciting flux and receiving its electrical energy from armature winding 13. This transfer of energy from winding 13 to winding 11 is due to the fact that armature winding 13 circulates current through windings 12 and 19; hence winding 19 acts as the primary of a transformer, winding 18 acts as the secondary of this transformer, and, since windings 11 and 18 are now connected in series the winding 11 is coupled in series relation with armature winding 13 and is energized thereby. Therefore, motor 10 operates as a self-excited generator and an effective braking action is produced until the armature winding has nearly ceased rotating. An additional braking effect is due to the above mentioned displacement between the magnetic axes of windings 12 and 13, the motor functioning as a self-excited generator with winding 12 furnishing exciting flux and receiving its electrical energy from armature winding 13. Of course, if desired, switch 26 may be opened during the braking operation and the braking action produced by the self-excited generator action due only to windings 12 and 13.

When motor 10 is operating as a motor at considerably above or below its synchronous speed its commutator brushes are quite remote from their synchronous speed position, and the magnetic axis of its armature winding is so related to the magnetic axes of its windings 11 and 12 that, if motor 10 is shut down by merely opening switch 24, no appreciable self-excited generator action will take place and there will be no effective braking action. I will first describe how an effective braking action may nevertheless be obtained by changing the time phase relationship between the voltages impressed on motor primary winding 11 and regulator primary winding 18. Thus, assume for example that the motor is operating as a motor at considerably below its synchronous speed, and that its commutator brushes 14 are in a sub-synchronous speed position quite remote from their synchronous speed position. To shut the motor down and bring it quickly to rest, open switch 24 and move switch 26 from its central closed position to its right-hand or left-hand closed position, depending on the connections made. I will assume that the connections are such as to require that switch 26 be closed in its right-hand position and that this is done. This change in the closed position of switch 26 changes the time phase relationship between the voltages impressed on windings 11 and 18 from that previously existing because each phase of winding 18 is now connected to a phase of winding 11 positioned 120 electrical degrees in a clockwise direction from the phase it was connected to before the closed position of switch 26 was changed. This change in time phase relationship causes winding 11 to become so energized by armature winding 13 that their magnetic axes are materially displaced from each other when the commutator brushes are in their last mentioned position. A self-excited generator action will therefore take place, hence producing an effective braking action.

Now assume that motor 10 is operating as a motor at considerably above its synchronous speed, and that its commutator brushes 14 are in a super-synchronous speed position quite remote from their synchronous speed position. To shut the motor down and bring it quickly to rest, open switch 24 and move switch 26 from its central closed position to its left-hand closed position. This change in the closed position of switch 26 not only changes the time phase relationship between the voltages impressed on windings 11 and 18 from that existing during normal motor operation but also changes it in the opposite manner to that previously described, because each phase of winding 18 is now connected to a phase of winding 11 positioned 120 electrical degrees in a counter-clockwise direction from the phase it was connected to before the closed position of the switch was changed. This change in time phase relationship causes winding 11 to become so energized by armature winding 13 that their magnetic axes are materially displaced from each other when the commutator brushes are in their last mentioned position. A self-excited generator action will therefore take place, hence producing an effective braking action.

When the motor is operating at considerably above or below its synchronous speed with its commutator brushes quite remote from their synchronous speed position, the motor may be shut down and an effective braking action produced by opening switches 24 and 26 and changing the time phase relationship between the voltages impressed on its windings 12 and 13. The essence of this feature is fully disclosed and claimed in my patent application, Serial No. 668,834, filed concurrently herewith and assigned to the assignee of this application, hence only a brief description will be given of this feature in order to show its relationship to other features. Thus, when the motor is operating at considerably below its synchronous speed with its commutator brushes quite remote from their synchronous speed position, the motor may be shut down and an effective braking action produced by opening switches 24 and 26 and moving switch 22 from its central closed position to its upper closed position, for example. On the other hand, when the motor is operating at considerably above its synchronous speed position with its commutator brushes quite remote from their synchronous speed position, the motor may be shut down and an effective braking action produced by opening switches 24 and 26, and moving switch 22 from its central closed position to its lower closed position. The moving of switch 22 from its central closed position to its upper or lower closed position changes the time phase relationship between the voltages impressed on windings 12 and 13 in opposite directions from that existing with the switch closed in its central position. In each case the change in time phase relationship is such that the magnetic axes of windings 12 and 13 are materially displaced from each other, hence producing a self-exciting generator action. If desired, the braking operation just described may be used simultaneously with that produced by changing the time phase relationship between the voltages impressed on primary windings 11 and 18 as previously described.

In Fig. 2 I illustrate an arrangement employing electromagnetically operated switches for connecting and disconnecting the motor and regulator primary windings to and from source 23 and for automatically effecting a change in the time phase relationship between the voltages impressed on these windings in accordance with the position of the commutator brushes when the motor is shut down. This arrangement comprises a solenoid operated switch 31 for connecting and disconnecting the motor primary winding 11 to and from source 23, this switch having an auxiliary pair of normally open contacts 32 and having an auxiliary pair of normally closed contacts 33. The regulator primary winding 18 may be connected to the terminals of the motor primary winding 11 by closing any one of three solenoid operated switches 34, 35, and 36. When switch 34 is closed the two primary windings are connected to each other the same as when switch 26 in Fig. 1 is in its central closed position; when switch 35 is closed the two primary windings are connected to each other the same as when switch 26 in Fig. 1 is in its right-hand closed position, and when switch 36 is closed the two primary windings are connected to each other the same as when switch 26 in Fig. 1 is in its left-hand closed position. Switch 34 has an auxiliary pair of normally open contacts 37 and an auxiliary pair of normally closed contacts 38. Two leads 39 and 40 are respectively connected to two lines of source 23. Lead 39 is connected to one terminal of the four coils of switches 31, 34, 35 and 36, respectively. The other terminal of the two coils of switches 31 and 34 respectively may be connected to lead 40 by closing a normally open push-button 41, or by closing either of normally open contacts 32 and 37 and through a normally closed push-button 42. The other terminal of the coil of switch 35 may be connected to lead 40 by closing a pair of normally open contacts 43 and by having contacts 33 and 38 closed, whereas the other terminal of the coil of switch 36 may be connected to lead 40 by closing a pair of normally open contacts 44 and by having contacts 33 and 38 closed. Each of two vertically movable rods 45 and 46 has a switch blade at its upper end for short-circuiting contacts 43 and 44 respectively, and has a cam follower 47 at its lower end in contact with the peripheral faces of cams 48 and 49 respectively. These cams are so secured to shaft 20 that when commutator brushes 14 are in approximately their synchronous speed position, neither of rods 45 and 46 are raised sufficiently to close their corresponding contacts 43 and 44. Cam 48 is also so secured to shaft 20 that when commutator brushes 14 have been moved a predetermined amount from their synchronous speed position to a sub-synchronous speed position the rod 45 will be raised sufficiently to close contacts 43 and to keep these contacts closed as the brushes are moved further from their synchronous speed position in the sub-synchronous speed range. Cam 49 is also so secured to shaft 20 that when commutator brushes 14 have been moved a predetermined amount from their synchronous speed position to a super-synchronous speed position, the rod 46 will be raised sufficiently to close contacts 44 and to keep these contacts closed as the brushes are moved further from their synchronous speed position in the super-synchronous speed range.

To start the motor, close push-button 41. This effects the energization of the coils of switches 31 and 34, thus closing these switches and connecting primary windings 11 and 18 to source 23. The closing of these switches opens contacts 33 and 38 and closes contacts 32 and 37. This establishes a holding circuit for the coils of switches 31 and 34, this circuit being from lead 39, through each coil separately, through either or both of contacts 32 and 37, and through push-button 42 to lead 40. Assume that the motor is operating with its commutator brushes at approximately their synchronous speed position. Contacts 43 and 44 will be open and therefore switches 35 and 36 will be open. Now assume that it is desired to shut down the motor. This is accomplished by opening push-button 42, thus causing switches 31 and 34 to open. The opening of these switches causes the closing of contacts 33 and 38, but this fact does not cause the closing of either of switches 35 and 36 because contacts 43 and 44 are open. A braking effect is nevertheless produced because with the commutator brushes at approximately their synchronous speed position, the magnetic axes of windings 12 and 13 are displaced from each other, hence motor 10 functions as a self-excited generator as described in connection with Fig. 1.

Now assume that motor 10 in Fig. 2 is operating at sufficiently below its synchronous speed so that cam 48 raises rod 45 sufficiently to close contacts 43. This does not effect the closing of switch 35 because contacts 33 and 38 are open when the motor is running. To shut down the motor, open push-button 42, thus causing switches 31 and 34 to open and contacts 33 and 38 to close. The closing of these contacts completes the circuit for the coil of switch 35, thus causing the latter to close. The closing of switch 35 connects primary winding 18 to primary winding 11 in the same way as when switch 26 in Fig. 1 is closed in its right-hand position, hence causing the motor to operates as a self-excited generator and to produce an effective braking action.

Now assume that motor 10 in Fig. 2 is operating at sufficiently above its synchronous speed so that cam 49 raises rod 46 sufficiently to close contacts 44. This does not effect the closing of switch 36 because contacts 33 and 38 are open when the motor is running. To shut down the motor, open push-button 42, thus causing switches 31 and 34 to open and contacts 33 and 38 to close. The closing of these contacts completes the circuit for the coil of switch 36, thus causing the latter to close. The closing of switch 36 connects primary winding 18 to primary winding 11 in the same way as when switch 26 in Fig. 1 is closed in its left-hand position, hence causing the motor to operate as a self-excited generator and to produce an effective braking action.

In Fig. 3 I have shown a switch 50 for connecting the regulator primary winding 18 directly to source 23 with a predetermined time phase relationship between the voltages impressed on this winding and the motor primary winding 11. I have also shown another switch 51 for connecting primary winding 18 to the terminals of primary winding 11 with a time phase relationship between the voltages impressed on these windings which is different from the above mentioned predetermined time phase relationship. During normal operation of motor 10 as a motor, switches 24 and 50 are closed and switch 51 is open. The motor may be shut down and an effective braking action produced when its commutator brushes are in any position between their approximate synchronous speed position and their lowest subsynchronous speed position by merely opening switch 24 and leaving switch 50 connected to source 23. The continued energization of the regulator primary winding 18 from source 23 after the motor primary winding is disconnected from this source produces a rotating magnetic field in the motor auxiliary winding 12 that causes an effective braking action to take place. The motor may be shut down and an effective braking action produced when its commutator brushes are in any position between their approximate synchronous speed position and their highest super-synchronous speed position by opening switches 24 and 50 and closing switch 51. The closing of switch 51 connects primary winding 18 to primary winding 11 in the same way as when switch 26 in Fig. 1 is closed in its left-hand position, hence causing the motor to operate as a self-excited generator and to produce an effective braking action.

It will now be obvious that my invention provides a simple, inexpensive and effective braking arrangement in which there is practically nothing to wear or get out of order.

In accordance with the provisions of the patent statutes, I have described the principles of operation of my invention, together with the apparatus which I now consider to represent the best embodiments thereof, but I desire to have it understood that the apparatus shown and described is only illustrative and that the invention may be carried out by other means.

What I claim as new and desire to secure by Letters Patent of the United States, is:

1. In combination, an alternating current motor having relatively rotatable primary and commutated windings, means for effecting the energization of said windings from an alternating current source and for effecting their de-energization from this source, and means for coupling said windings in series relation with each other after said de-energization is effected so that the existence of residual flux in said motor and the relative rotation of its windings cause said commutated winding so to energize the motor primary winding that the magnetic axis of the latter is displaced from the magnetic axis of the commutated winding, thereby causing said motor to act as a self-excited generator.

2. In combination, an alternating current motor having relatively rotatable primary and commutated windings, regulating means connected to said commutated winding for impressing thereon a variable alternating voltage, means for connecting and disconnecting said primary winding and regulating means to and from an alternating current source, and means for connecting said regulating means to said primary winding after both are disconnected from said source so that the existence of residual flux in said motor and the relative rotation of its windings cause said commutated winding so to energize the motor primary winding through the regulating means that the magnetic axis of the primary winding is displaced from the magnetic axis of the commutated winding, thereby causing said motor to act as a self-excited generator.

3. In combination, an alternating current motor having relatively rotatable primary and commutated windings, regulating means connected to said commutated winding for impressing thereon a variable alternating voltage, means for connecting said primary winding and regulating means to an alternating current source with a predetermined time phase relationship between the voltages impressed thereon and for disconnecting them from this source, and means for connecting said primary winding and regulating means to each other with a different time phase relationship between the voltages impressed thereon by self-excited generator action of said motor after they have been disconnected from said source.

4. In combination, an alternating current motor having relatively rotatable primary and commutated windings, an induction voltage regulator having relatively rotatable primary and secondary windings, means for connecting said secondary winding in series with said commutated winding, means for connecting said primary windings to an alternating current source with a predetermined time phase relationship between the voltages impressed thereon, and means for connecting said primary windings only to each other with a different time phase relationship between the voltages impressed thereon by self-excited generator action of said motor.

5. In combination, a three-phase alternating current motor having a stationary primary winding and a rotatable commutated armature winding, a three-phase induction voltage regulator having relatively rotatable primary and secondary windings, means for connecting said secondary winding in series with said commutated armature winding, means for connecting said primary windings to a three-phase alternating current source with a predetermined time phase relationship between the voltages impressed thereon and for disconnecting them from this source, and means for connecting said primary windings to each other after they are disconnected from said source so that the time phase relationship between the voltages impressed thereon by self-excited generator action of said motor differs by 120 electrical time degrees from said predetermined time phase relationship.

6. In combination, an alternating current motor having a stationary primary winding, a rotatable commutated armature winding with a plurality of circumferentially spaced apart movable brushes bearing on its commutator, and means for moving said brushes circumferentially about the commutator, an induction voltage regulator having relatively rotatable primary and secondary windings, means for connecting said secondary winding in series with said armature windings, means for connecting said primary windings to an alternating current source with a predetermined time phase relationship between the voltages impressed thereon, switching means for reconnecting said primary windings only to each other so that the time phase relationship of the voltages impressed thereon by self-excited generator action of said motor differs from said predetermined time phase relationship, and means responsive to the operation of said brush moving means for preventing the closing of said switching means except when said brushes are in predetermined circumferential positions about said commutator.

7. In combination, an alternating current motor having a stationary primary winding, a rotatable commutated armature winding with a plurality of circumferentially spaced apart movable brushes bearing on its commutator, and means for moving said brushes circumferentially about the commutator, an induction voltage regulator having relatively rotatable primary and secondary windings, means for connecting said secondary winding in series with said armature winding, means for connecting said primary windings to an alternating current source with a predetermined time phase relationship between the voltages impressed thereon, switching means for reconnecting said primary windings only to each other so that the time phase relationship of the voltages impressed thereon by self-excited generator action of said motor differs from said predetermined time phase relationship, and a movable cam actuated by said brush moving means, said cam being suitably arranged adjacent said switching means to place the latter in condition for closing only when said brushes are in predetermined circumferential positions about said commutator.

8. In combination, an alternating current motor having a stationary primary winding and a rotatable commutated armature winding with a plurality of circumferentially spaced apart movable brushes bearing on its commutator, an induction voltage regulator having relatively rotatable primary and secondary windings, means for connecting said secondary winding in series with said commutater armature winding, means for moving said brushes circumferentially about said commutator, means for connecting said primary windings to an alternating current source with a predetermined time phase relationship between the voltages impressed thereon and for disconnecting them from this source, switching means for reconnecting said primary windings only to each other so that the time phase relationship of the voltages impressed thereon by self-excited generator action of said motor differs from said predetermined time phase relationship, switching means for reconnecting said primary windings only to each other so that the time phase relationship of the voltages impressed thereon by self-excited generator action of said motor differs from said predetermined time phase relationship and also differs from the time phase relationship existing therebetween when the first mentioned switching means are closed, and means responsive to the operation of said brush moving means and the disconnection of said primary windings from said source for effecting the closing of one of said switching means when said brushes have been shifted a predetermined amount in one direction from their synchronous speed position and for effecting the closing of the other of said switching means when said brushes have been shifted a predetermined amount in the opposite direction from their synchronous speed position.

9. The method of braking a rotating alternating current motor having a primary winding and a commutated armature winding energized from an alternating current source and having its commutator brushes positioned comparatively remote from their synchronous speed position, which comprises removing the alternating voltage applied to the motor windings, and so energizing the primary winding from the armature winding that the magnetic axis of the primary winding is displaced from the magnetic axis of the armature winding, whereby the motor operates as a self-excited generator.

10. The method of braking a rotating alternating current motor having a stationary primary winding, a stationary auxiliary winding and a rotatable commutated armature winding all energized from an alternating current source and having its commutator brushes positioned comparatively remote from their synchronous speed position, which comprises removing the alternating voltage applied to the motor windings, and so energizing the primary and auxiliary windings from the armature winding that the magnetic axes of the primary and auxiliary windings are displaced from the magnetic axis of the armature winding, whereby the motor operates as a self-excited generator.

11. The method of braking a rotating alternating current motor having a primary winding connected to an alternating current source and a commutated armature winding connected in series with the secondary winding of an induction voltage regulator whose primary winding is also connected to the source, and having its commutator brushes positioned comparatively remote from their synchronous speed position, which comprises removing the alternating voltage applied to the primary windings of the motor and the voltage regulator, and establishing a connection between the regulator primary winding and the motor primary winding to cause the magnetic axis of the latter to be displaced from the magnetic axis of the armature winding, whereby the motor operates as a self-excited generator.

12. The method of braking a rotating alternating current motor having a primary winding connected to an alternating current source and a commutated armature winding connected in series with the secondary winding of an induction voltage regulator whose primary winding is also connected to this source, which comprises removing the alternating voltage applied to the motor primary winding and continuing the energization of the regulator primary winding from the alternating current source.

13. The method of braking a rotating alternating current motor having a primary winding connected to an alternating current source and a commutated armature winding connected in series with the secondary winding of an induction voltage regulator whose primary winding is also connected to this source, and having commutator brushes movable about the commutator, which comprises removing the alternating voltage applied to the motor primary winding and continuing the energization of the regulator primary winding from the alternating current source when the commutator brushes are in a subsynchronous speed position; and removing the alternating voltage applied to the primary windings of the motor and voltage regulator and establishing a connection between the regulator primary winding and the motor primary winding to cause the magnetic axis of the latter to be displaced from the magnetic axis of the armature winding when the commutator brushes are in a supersynchronous speed position.

GEORG GÜNNER.